(No Model.) 2 Sheets—Sheet 1.
J. C. HALL.
PNEUMATIC WHEEL FOR VEHICLES.
No. 476,764. Patented June 7, 1892.
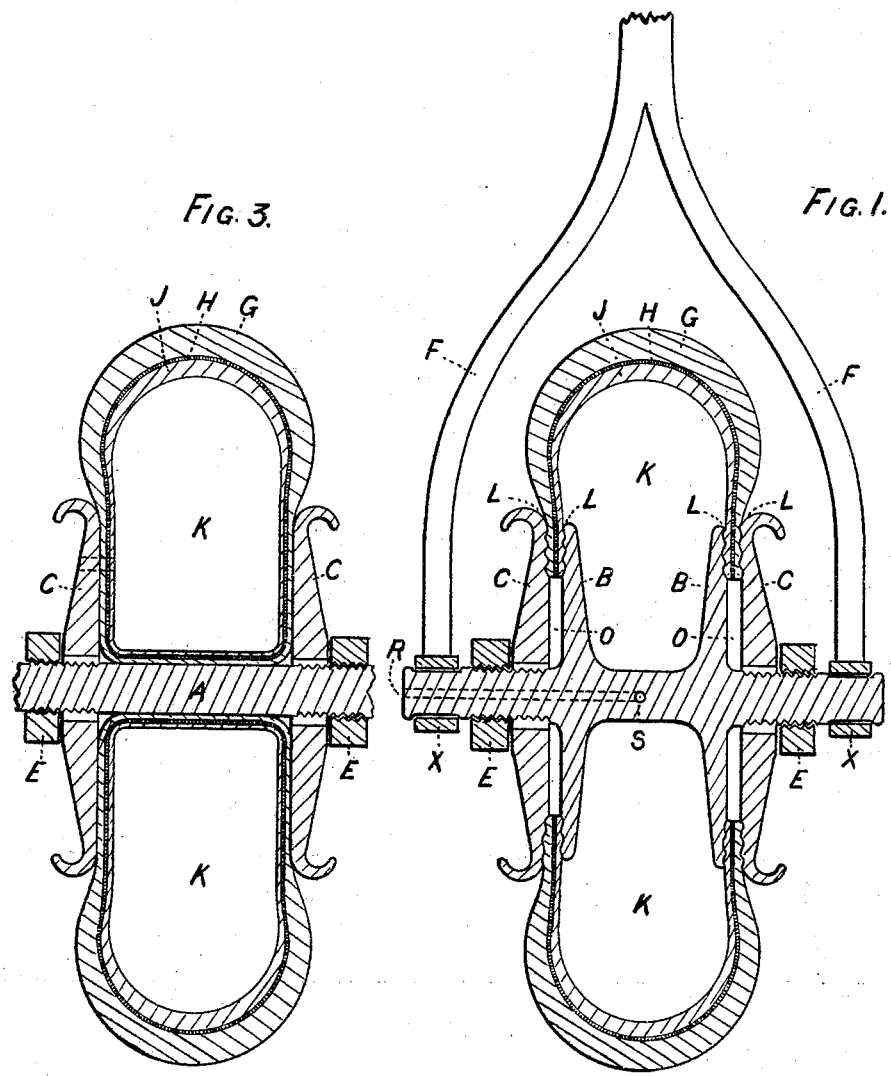
Witnesses:—
C. A. Churchill.
Chas Londer
Inventor:—
J Castle Hall (No Model.) 2 Sheets—Sheet 2.
J. C. HALL.
PNEUMATIC WHEEL FOR VEHICLES.
No. 476,764. Patented June 7, 1892.
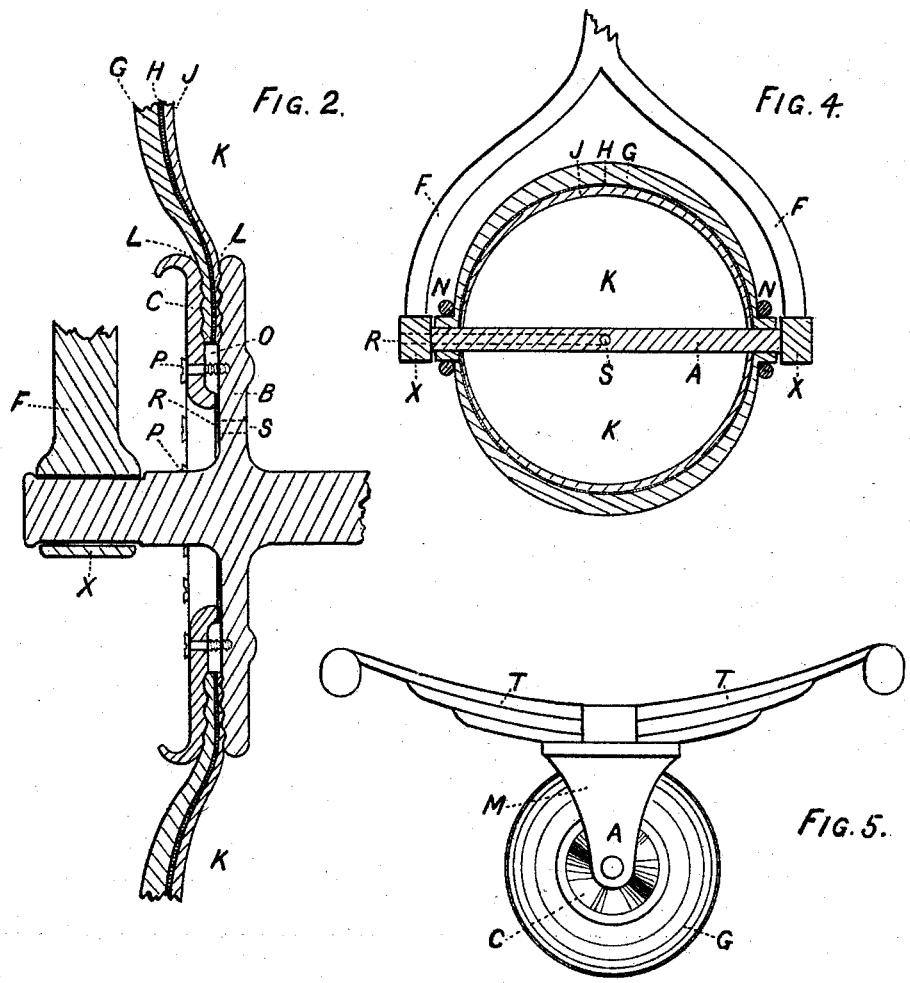
Witnesses:—
C. A. Churchill,
Chas Larder
Inventor:—
J. Castle Hall

UNITED STATES PATENT OFFICE.

JOSEPH CASTLE HALL, OF LONDON, ENGLAND.

PNEUMATIC WHEEL FOR VEHICLES.

SPECIFICATION forming part of Letters Patent No. 476,764, dated June 7, 1892.

Application filed June 20, 1891. Serial No. 397,004. (No model.) Patented in England March 5, 1891, No. 3,968.

*To all whom it may concern:*

Be it known that I, JOSEPH CASTLE HALL, a subject of the Queen of Great Britain, residing at 116 Mildmay Road, Mildmay Park, London, England, have invented certain new and useful Improvements in Air or Pneumatic Wheels for Cycles, Cabs, and other Vehicles; that I have applied for Letters Patent for the same for England, which application, together with provisional specification, has been duly accepted, being dated the 5th of March, 1891, and numbered 3,968; and I do hereby declare that the following is a full, clear, and exact description of the same, reference being had to the two sheets of accompanying drawings, and to and letters marked thereon, which form part of this specification.

This invention relates to air or pneumatic wheels applicable for cycles, cabs, and other vehicles.

My said invention consists in constructing a wheel without ordinary spokes, rim, or tire, substituting therefor a circular chamber filled with compressed air or gas. The said air or gas is contained within walls consisting either wholly or partly, as hereinafter described, of layers, separate jackets, or envelopes of india-rubber and suitable non-expansive textile fabric or fabrics. The said layers, separate jackets, or envelopes may either be loose from each other or may in their construction be cemented together and form a solid wall or shell. By preference I use an inner envelope of india-rubber, an intermediate envelope of one or more thicknesses of canvas or other textile fabric, and an outer covering of india-rubber. When constructed separately, the said outer cover and also the intermediate covers or cover may be partly laced or sewed up at one side, such lacing being after the manner of the lacing up of a foot-ball, and thus facilitating access to the inner envelope for repairs should the same become punctured.

I am aware that wheels have been constructed for velocipedes or cycles with tires carrying a hollow expansible tube of india-rubber surrounded with envelopes of canvas and india-rubber, respectively, that the said hollow tube has been inflated with air or gas, and that there are various methods of securing such tires to the rims of wheels, the said rims being connected to the hubs or boxes of wheels by means of spokes in the ordinary way.

In carrying into effect my said invention and in the construction of a wheel for the purpose of a bicycle, for example, I take a steel axle which carries two steel flanges or hubs, the said hubs being three or four inches apart and, for example, nine inches in diameter. These flanges are part of or securely fixed to the said axle. I now take the said air-chamber, which, for the purpose of illustration, may be referred to as a large hollow flattened ball with a circular aperture cut through the center of the two flat sides, such aperture being two or three inches less in diameter than the fixed flanges before mentioned. This air-chamber is then fixed upon the axle and so arranged that each of the said fixed flanges is within and presses against the interior of the edges of the chamber. In order to secure the air-chamber in this position, I place two loose flanges or washers one at each end of the axle and similar in diameter to the fixed flanges, sliding them on the axle until they come against the edges or walls of the said air-chamber. A suitable nut being now screwed upon each end of the axle forces the loose flanges or washers against both the edges of the air-chamber, which latter are thus held between the fixed flanges and the said loose flanges or washers. The air-chamber being now inflated a wheel is formed consisting of an axle with hubs and a chamber filled with compressed air. With the exception of the said axle, which passes across the center, the compressed air thus constitutes the interior or body of the entire wheel. The height of the wheel may vary according to the requirements of the vehicle; but when constructed with flanges of about nine inches diameter, as hereinbefore described, I make the air-chamber of such dimensions that the entire wheel is eighteen or twenty inches in depth. Hence the outer flanges or washers are about half the depth of the whole wheel.

Referring to Fig. 1 of the annexed drawings, A is the axle; B B, the fixed flanges; C C, the loose flanges or washers. E E are the screws by which the said loose flanges are forced toward the fixed ones. F F are the forks which carry the bearings X X, in which latter the axle of the wheel revolves. G, H, and J represent the walls of the air-chamber, G being the outer shell of india-rubber, H a canvas or other textile fabric, and J an inner shell of india-rubber. K indicates the interior of the air-chamber, which is inflated with air or gas by means of an ordinary air-pump through a suitable aperture in the axle, as shown by the dotted lines from R to S. I provide an ordinary non-return valve for the said aperture through which the air is pumped. O O show the aperture in the walls of the air-chamber. The flanges B B and C C take hold of the edges of the air-chamber at L L and L L, the said flanges being corrugated, as shown by the curved lines, in order to hold the said edges of the air-chamber more securely.

Fig. 2 illustrates another modification for securing the edges of the air-chamber to the fixed flanges B B. C represents a loose washer, having a larger aperture in its center than as shown by C C, Fig. 1. This ring or washer is secured in its place by small screws P P P at intervals of two or three inches apart, the said screws taking the place of the screws E E, Fig. 1. The said small screws pass through the said ring or flange and screw into the fixed flange B. R S indicate the position of the air-valve, which may pass through the fixed flange B instead of through the axle, as shown in Fig. 1.

Fig. 3 illustrates a further modification of the air-chamber. I construct in this case the said chamber with only a tubular aperture through the center, having a diameter about equal to that of the axle, and the walls of the said chamber are continued and form, also, the walls of the said tube or aperture. The said air-chamber in this case constitutes a ring of air contained within the said walls and encircling the axle A, as shown. The flanges C C are in this case forced against the walls of the air-chamber by means of the screws E E, or one of the said flanges may be fixed to the axle and the other may be loose and forced against the air-chamber by means of a single screw, as before mentioned. A valve for inflation is arranged either through the axle, as described in Fig. 1, or otherwise, through one of the flanges aforesaid, and also through the walls of the said chamber. The forks and bearings are arranged in the ordinary way.

Fig. 4 is a further modification of the air-chamber. In this case it is composed substantially of a spherical body, the walls whereof are formed like a bladder with two necks. Through these necks and through the interior of the air-chamber is passed the axle, and in order to secure the latter to the said necks of the air-chamber I arrange suitable rings of wire, catgut, or other similar material N N. The axle revolves in the bearings X X, which are carried by the forks F F in the ordinary way. An air or pneumatic wheel is thus constituted, comprising a globe of compressed air or gas contained within the walls G H J, constructed as hereinbefore described, and which revolves, together with its axle A, within the said bearings X X. The said wheel may be inflated, as shown in Fig. 1—namely, through the aperture in the axle from R to S.

Fig. 5 is a plan view of a wheel constructed as illustrated in Figs. 1 and 3. A is the axle, C the flange, and G that portion of the air-chamber which comes beyond the said flange. M and T T illustrate the attachments where the said wheel is applied to carriages, T T being an ordinary carriage-spring, and M the connecting part from the axle A to the said spring T T.

Without departing from the spirit of my said invention the before-mentioned measurements given for the diameter of the wheels may be varied according to the requirements of the vehicle to which the wheels are applied. Nor do I confine myself to any particular method of inflating the air-chambers. The flanges or any of them hereinbefore mentioned may also be made of wood, papier-maché, or other suitable material instead of steel.

Having now described and particularly ascertained the nature of my said invention and the method of carrying it into practice, I declare that what I claim is—

1. A wheel for cycles, cabs, and other vehicles, consisting of a chamber filled with compressed air or gas and constructed without ordinary spokes, rim, or tire, substantially as set forth.

2. A wheel for cycles, cabs, and other vehicles, consisting of a chamber filled with compressed air or gas, the walls of the said chamber consisting partly of layers, separate jackets, or envelopes of india-rubber and non-expansive textile fabric and partly of circular inner flanges of metal or other material, extending from an axle and secured in position by means of outer flanges or washers, substantially as set forth.

3. A wheel for cycles, cabs, and other vehicles, consisting of a chamber filled with compressed air or gas, the walls of the said chamber consisting of layers, separate jackets, or envelopes of india-rubber and non-expansive textile fabric and being secured to an axle by means of flanges extending therefrom at each side of the said chamber, the said walls having an inner tube or aperture through their center and through which the axle passes, and the said aperture or tube being composed of the same material or walls as the outer walls of the said chamber, substantially as set forth.

4. A wheel for cycles, cabs, and other vehicles, consisting, first, of a spherical chamber filled with compressed air or gas, the walls of the said chamber being composed of layers, separate jackets, or envelopes of india-rubber and non-expansive textile fabric, and, second, of an axle which is passed through the center of the said spherical chamber and the walls thereof, which axle fits within the two apertures or orifices in the walls aforesaid with sufficient tightness to prevent the escape of air from the interior of the chamber, substantially as set forth.

Dated this 1st day of May, 1891.

J. CASTLE HALL.

Witnesses:
C. A. CHURCHILL,
CHAS. LARDER.